(12) United States Patent
Akamatsu et al.

(10) Patent No.: US 6,752,031 B2
(45) Date of Patent: Jun. 22, 2004

(54) NC MACHINE TOOL HAVING SPINDLE RUN-OUT DIAGNOSING FUNCTION

(75) Inventors: Yoshiaki Akamatsu, Yamatokoriyama (JP); Makoto Fujishima, Yamatokoriyama (JP)

(73) Assignees: Mori Seiki Co., Ltd., Yamatokoriyama (JP); Intelligent Manufacturing Systems International, Sacramento, CA (US)

( * ) Notice: Subject to any disclaimer, the term of this patent is extended or adjusted under 35 U.S.C. 154(b) by 286 days.

(21) Appl. No.: 09/870,464

(22) Filed: Jun. 1, 2001

(65) Prior Publication Data

US 2001/0049974 A1 Dec. 13, 2001

(30) Foreign Application Priority Data

Jun. 7, 2000 (JP) ....................................... 2000-169960

(51) Int. Cl.[7] .............................................. G01N 19/00
(52) U.S. Cl. ..................................................... 73/865.9
(58) Field of Search ........................... 73/865.9, 865.8, 73/863.9; 33/710, 832, 833, 201, 545, 533, 639, 642, 500, 555, 504, DIG. 8

(56) References Cited

U.S. PATENT DOCUMENTS

| | | | | |
|---|---|---|---|---|
| 4,775,947 A | * | 10/1988 | Marron | 33/550 |
| 5,224,272 A | * | 7/1993 | Toraason et al. | 33/550 |
| 5,864,238 A | * | 1/1999 | Iijima et al. | |
| 6,134,976 A | * | 10/2000 | Elsing | |

FOREIGN PATENT DOCUMENTS

| | | |
|---|---|---|
| JP | 05-065942 | 3/1993 |
| JP | 08-112755 | 5/1996 |
| JP | 08-171407 | 7/1996 |
| JP | 08-197384 | 8/1996 |
| JP | 10-043902 | 2/1998 |

OTHER PUBLICATIONS

The American Society of Mechanical Engineers, United Engineering Center, ANSI/ASME B89.3.4M–1985 pp. 1–44.

* cited by examiner

Primary Examiner—Robert Raevis
(74) Attorney, Agent, or Firm—Westerman, Hattori, Daniels & Adrian, LLP

(57) ABSTRACT

The present invention provides an NC machine tool which permits a check for the run-out of a spindle thereof at any time. The NC machine tool includes deflection detecting means (22) provided on a base within a machining area, and run-out diagnosing means (8) for conducting a diagnosis on the run-out of the spindle by calculating the amount of the run-out of the spindle on the basis of a deflection detected by the deflection detecting means (22) and comparing the calculated run-out amount with a predetermined tolerance. A test tool is attached to the spindle and rotated about an axis thereof, and the deflection of an outer circumferential surface of the test tool is detected by the deflection detecting means (22). On the basis of the deflection thus detected, the run-out diagnosing means (8) conducts a diagnosis on the run-out of the spindle. The diagnosis on the run-out of the spindle can be achieved through a simple and easy operation by moving the test tool into a detection area of the deflection detecting means (22).

3 Claims, 4 Drawing Sheets

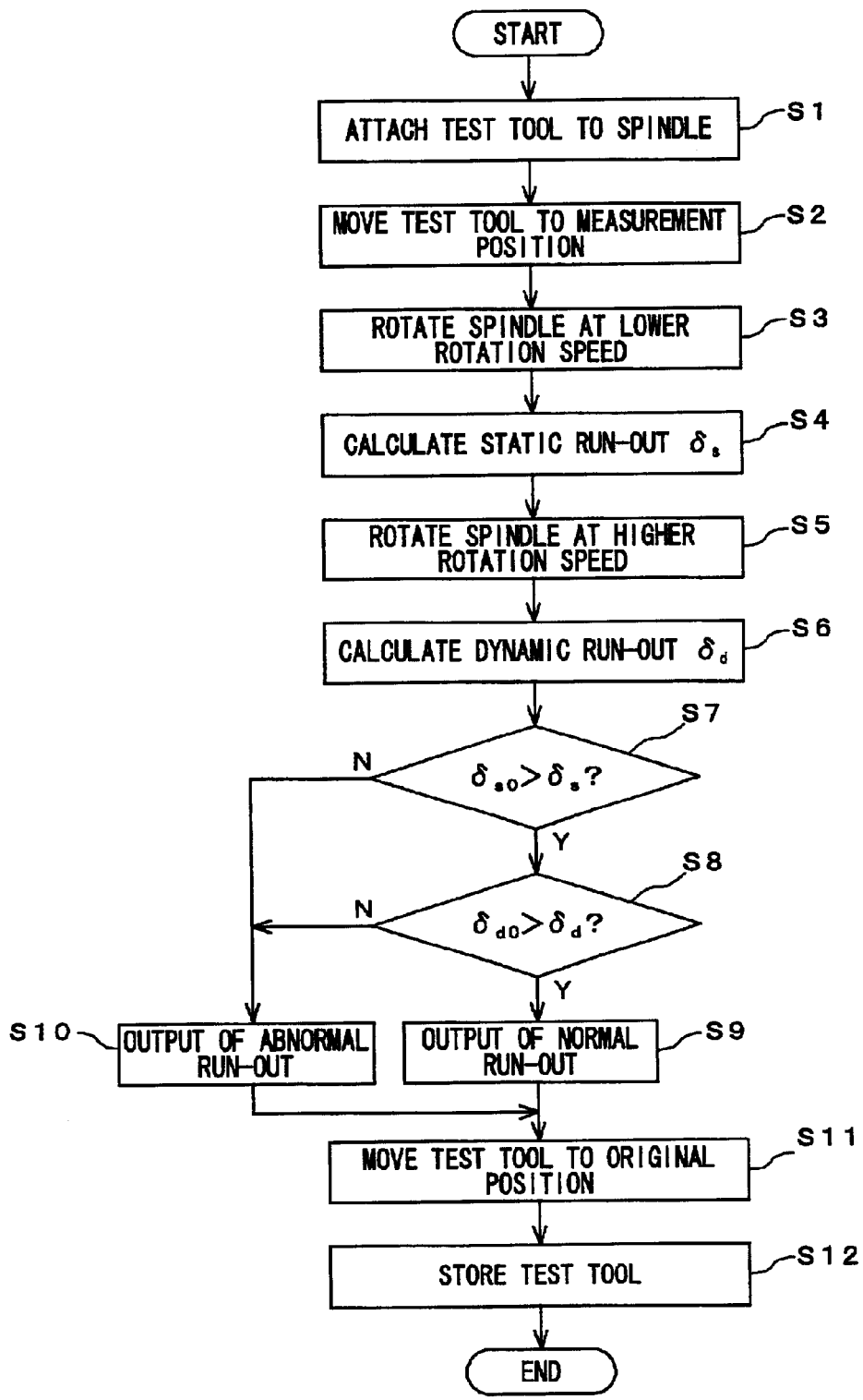

NC MACHINE TOOL HAVING SPINDLE RUN-OUT DIAGNOSING FUNCTION

BACKGROUND OF THE INVENTION

1. Field of the Invention

The present invention relates to an NC machine tool which has a spindle for rotating a tool held thereby and is adapted to numerically control a relative movement between the spindle and a workpiece and to conduct a diagnosis on the run-out of the spindle.

2. Description of the Prior Art

The run-out of a spindle of a machine tool directly affects machining accuracies associated with the position, inner diameter and roundness of a machined hole. Therefore, the machine tool is inspected for the run-out of the spindle and conditioned so that the run-out of the spindle falls within a predetermined standard tolerance before delivery thereof from a machine tool maker to a user.

A typical method for the pre-delivery inspection is such that a cylindrical test tool having an outer circumferential surface finished with a high level of accuracy or a test tool having a spherical ball fixed to a shaft thereof is fitted in a taper hole of the spindle and rotated about an axis thereof, and the amount of a deflection of the outer circumferential surface of the test tool is measured, on the basis of which the run-out of the test tool is determined. Another known method for the inspection is such that a small-diameter parabolic mirror is attached to the center of a spindle nose, and a light beam from a microscope disposed with its optical axis substantially aligned with the center axis of the spindle is reflected on the parabolic mirror and projected onto a film through the microscope for imaging, and the run-out of the center axis of the spindle is determined on the basis of the result of the imaging.

A device for the pre-delivery inspection is provided separately from the NC machine tool. Where the run-out of the spindle is measured on a user side, the user has to provide such an inspection device on the user side.

As the NC machine tool is used for machining, the run-out of the spindle is gradually aggravated from an initial level observed at the delivery due to the aging of a bearing which supports the spindle. Therefore, it is preferred to regularly inspect the spindle for the run-out for prevention of a machining failure and a malfunction of the machine tool. With a recent tendency toward the speed-up of the machining, the rotation speed of the spindle has been increased to several hundreds thousand rpm ($\min^{-1}$). Therefore, it is preferred to determine a static run-out observed when the spindle is rotated at a lower rotation speed as well as a dynamic run-out observed when the spindle is rotated at a higher rotation speed.

However, great costs are generally required for production of the inspection device on the user side, so that it is very difficult to prepare a special-purpose inspection device as described above on the user side.

A typical method for the determination of the run-out of the spindle on the user side is such that a test tool as described above is fixed to the spindle, and the run-out of the test tool is measured with the use of an indicator such as a dial gage while the spindle is slowly rotated with a probe of the indicator pressed against the outer circumferential surface of the test tool.

However, the indicator such as the dial gage has a measuring accuracy of about 2 $\mu$m to 10 $\mu$m, and is undoubtedly unsatisfactory as a run-out detector. Even if the regular inspection is conducted with the use of the indicator, there is virtually no change in the detected run-out. Therefore, the user refrains from the troublesome inspection operation, and tends to neglect to conduct the regular inspection. In most cases, the user inspects the spindle for the run-out after occurrence of a machining failure to find the cause of the machining failure.

In view of the foregoing, it is an object of the present invention to provide an NC machine tool which allows for a check for the run-out of a spindle thereof at any time.

SUMMARY OF THE INVENTION

In accordance with the present invention to solve the aforesaid problems, there is provided an NC machine tool which has a spindle for rotating a tool held thereby and is adapted to numerically control a relative movement between the spindle and a workpiece, the NC machine tool comprising: deflection detecting means provided on a base within a machining area for detecting a deflection of an outer circumferential surface of a test tool attached to the spindle when the test tool is rotated about an axis thereof; and run-out diagnosing means for conducting a diagnosis on the run-out of the spindle by calculating the amount of the run-out of the spindle on the basis of the deflection detected by the deflection detecting means and comparing the calculated run-out amount with a predetermined tolerance.

In accordance with the present invention, the test tool attached to the spindle is manually or automatically moved so that the outer circumferential surface thereof is located within a detection area of the deflection detecting means. Then, the test tool is rotated about the axis thereof, and the deflection of the outer circumferential surface thereof is detected by the deflection detecting means provided on the base within the machining area. Subsequently, the run-out diagnosing means calculates the amount of the run-out of the spindle on the basis of the detected deflection, and compares the calculated run-out amount with the predetermined tolerance for the diagnosis on the run-out of the spindle.

In the present invention, the diagnosis on the run-out of the spindle can be achieved through a very simple and easy operation by moving the test tool attached to the spindle so that the outer circumferential surface thereof is located within the detection area of the deflection detecting means. Therefore, a user of the NC machine tool can easily perform a regular run-out diagnosing operation in a daily work at any time. By thus performing the regular run-out diagnosing operation, a machining failure and a malfunction of the machine tool can be prevented.

The deflection detecting means comprises a main body having an insertion hole for receiving the test tool, and a non-contact type deflection detecting sensor fixed to the main body with a detecting portion thereof projecting in the insertion hole. The main body is fixed to the base, and the deflection of the test tool is detected by the non-contact type deflection detecting sensor with the test tool inserted in the insertion hole of the main body.

Since the deflection of the test tool is detected with the test tool inserted in the insertion hole of the main body, the test tool can exactly and properly be positioned with respect to the deflection detecting sensor simply by inserting the test tool into the insertion hole. Therefore, the positioning of the test tool can easily be achieved by manually moving the test tool. Further, the deflection of the test tool can be detected with a high level of accuracy by exactly positioning the test tool.

The deflection detecting means may include at least two non-contact type deflection detecting sensors disposed with deflection detecting directions thereof being perpendicular to each other.

The spindle runs out of its rotation center axis not only evenly but also eccentrically in one direction. In such a case, if a single deflection detecting sensor for the detection of the deflection of the test tool is located in a position where the deflection is smaller, the deflection of the test tool (i.e., the run-out of the spindle) cannot accurately be detected. With the aforesaid arrangement, the at least two deflection detecting sensors are disposed with the detecting directions thereof being perpendicular to each other, so that even the eccentric run-out of the spindle can assuredly be detected by either one of the deflection detecting sensors. Thus, the run-out of the spindle can accurately be detected.

The deflection detecting means may include two pairs of non-contact type deflection detecting sensors disposed in diametrically opposite relation with deflection detecting directions of one pair of non-contact type deflection detecting sensors being perpendicular to deflection detecting directions of the other pair of non-contact type deflection detecting sensors.

With this arrangement, the two pairs of non-contact type deflection detecting sensors disposed in diametrically opposite relation with the deflection detecting directions of the one pair being perpendicular to the deflection detecting directions of the other pair, so that the run-out of the spindle can more accurately be detected.

The run-out diagnosing means may be adapted to conduct a diagnosis on a static run-out observed when the spindle is rotated at a lower rotation speed and on a dynamic run-out observed when the spindle is rotated at a higher rotation speed.

As described above, the spindle is rotated at several hundreds thousand rpm (min$^{-1}$) for the speed-up of the machining. Therefore, it is preferred to determine the static run-out of the spindle rotated at the lower rotation speed as well as the dynamic run-out of the spindle rotated at the higher rotation speed. With the aforesaid arrangement, the diagnosis is conducted on the static run-out of the spindle rotated at the lower rotation speed and on the dynamic run-out of the spindle rotated at the higher rotation speed, so that the spindle run-out diagnosing operation can be performed in a suitable manner for the higher-speed machining. The term "lower rotation speed" herein means a rotation speed up to 100 min$^{-1}$ and, for stable measurement of the deflection, the lower rotation speed is preferably not higher than 100 $^{-1}$. The term "higher rotation speed" herein means a rotation speed higher than the lower rotation speed. The higher rotation speed is preferably the highest possible rotation speed, as long as data can properly be sampled by a controller. More preferably, the higher rotation speed is a rotation speed closer to a natural frequency of the spindle to provide stricter measuring conditions.

BRIEF DESCRIPTION OF THE DRAWINGS

FIG. 6 is a flow chart for explaining a process to be performed by a run-out diagnosing section according to the embodiment.

DESCRIPTION OF THE PREFERRED EMBODIMENT

Figure 1:
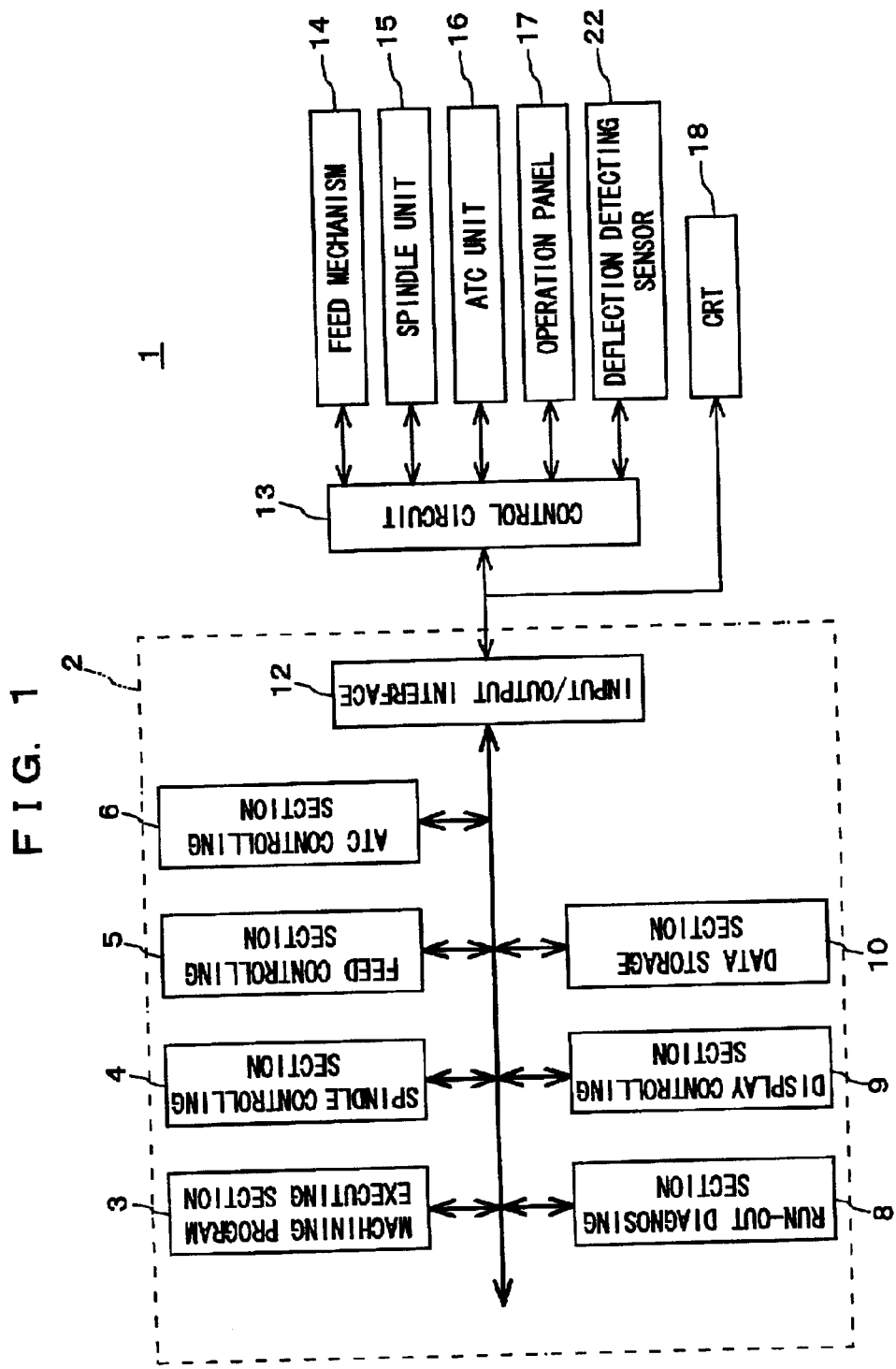
FIG. 1 is a block diagram schematically illustrating the construction of an NC machine tool according to one embodiment of the present invention.

With reference to the attached drawings, the present invention will hereinafter be described by way of a specific embodiment thereof. FIG. 1 is a block diagram schematically illustrating the construction of an NC machine tool according to this embodiment.

Figure 2:
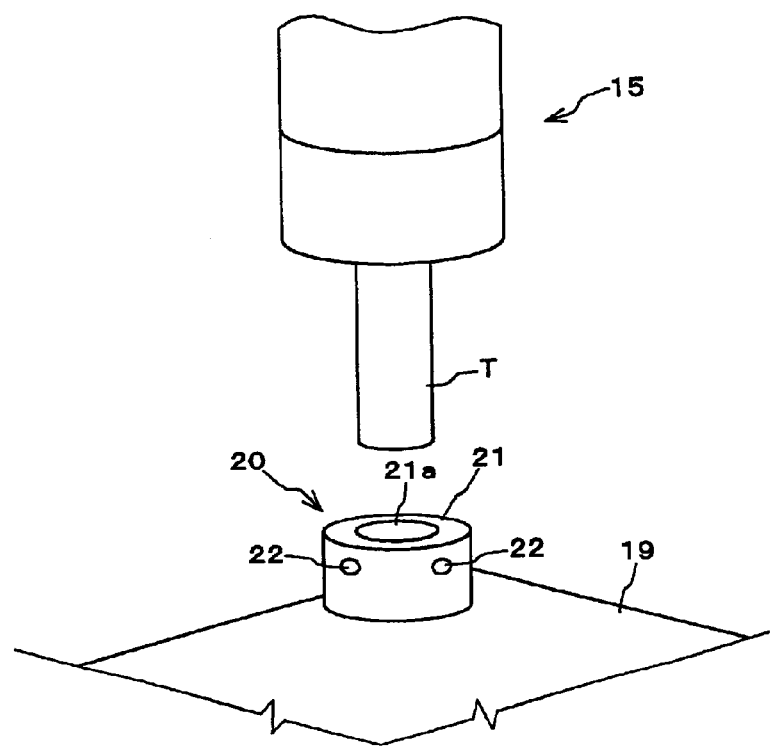
FIG. 2 is a perspective view illustrating a state where deflection detecting means according to the embodiment is fixed onto a table.
Figure 3:
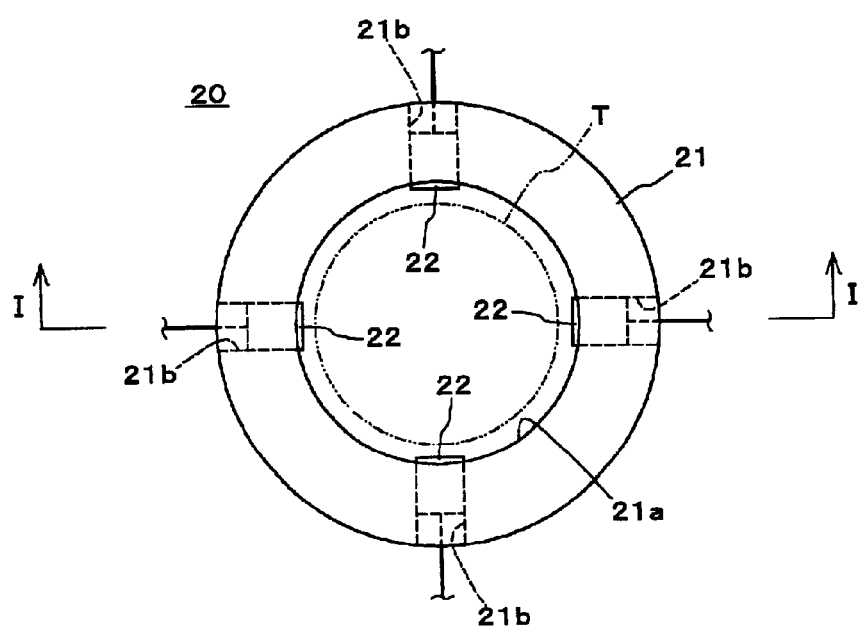
FIG. 3 is a plan view illustrating the deflection detecting means according to the embodiment.
Figure 4:
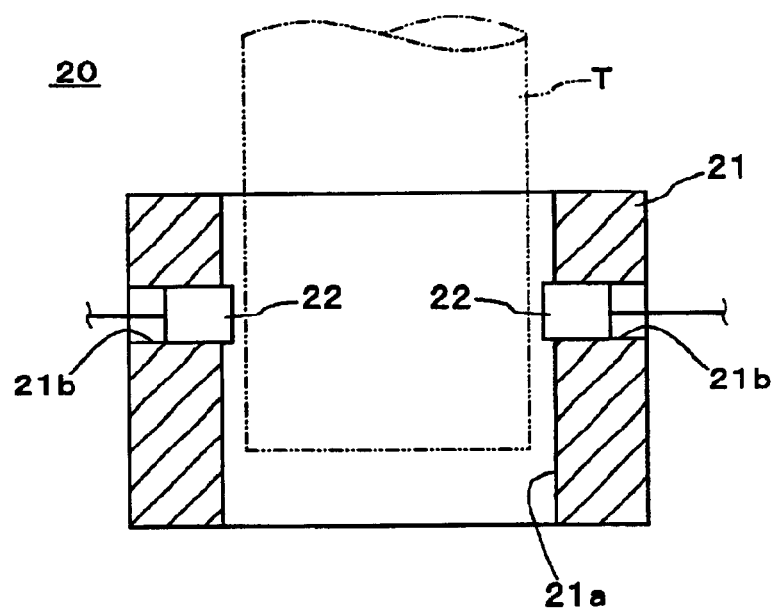
FIG. 4 is a sectional view as seen in the direction of arrows I—I in FIG. 3.

As shown in FIG. 1, the NC machine tool 1 of this embodiment includes a numerical controller 2, a control circuit 13, a feed mechanism 14, a spindle unit 15, an ATC unit 16, an operation panel 17, a CRT 18, and deflection detecting means 20 as shown in FIGS. 2 to 4.

As shown in FIG. 2, the deflection detecting means 20 includes a main body 21 fixed to a base such as a table 19, and deflection detecting sensors 22 fixed to the main body 21. The deflection detecting sensors 22 may be of a non-contact type such as of an eddy current type, a capacitance type, an infrared ray type, an X-ray type or a γ-ray type.

The main body 21 is an annular member having an insertion hole 21a formed in the center thereof for receiving a test tool T attached to the spindle unit 15. As shown in FIGS. 3 and 4, the main body 21 has four through-holes 21b circumferentially equidistantly formed in a peripheral wall thereof as extending from the outer circumferential surface toward the center of the insertion hole 21a. The deflection detecting sensors 22 are respectively fitted in the through-holes 21b and fixed to the main body 21 with detecting portions thereof projecting into the insertion hole 21a. The deflection detecting sensors 22 are not brought into contact with the test tool T inserted in the insertion hole 21a. As shown in FIG. 1, the deflection detecting sensors 22 are each connected to the numerical controller 2 via the control circuit 13, and data indicative of a deflection detected by the respective deflection detecting sensors 22 is inputted to the numerical controller 2.

Figure 5:
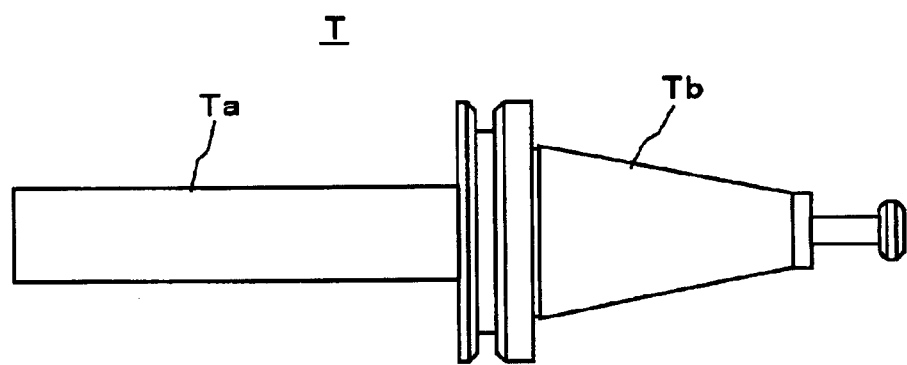
FIG. 5 is a plan view illustrating a test tool to be employed in the embodiment.

As shown in FIG. 5, the test tool T includes a taper shank Tb to be fitted in a taper hole of a spindle, and a cylindrical portion Ta exactly coaxially aligned with the taper shank Tb and having a high roundness. The test tool T is usually stored in a tool magazine not shown and, as required, carried out of the tool magazine and attached to the spindle by the ATC unit 16.

As shown in FIG. 1, the numerical controller 2 includes a machining program executing section 3, a spindle controlling section 4, a feed controlling section 5, an ATC controlling section 6, a run-out diagnosing section 8, a display controlling section 9, a data storage section 10, and an input/output interface 12. The machining program executing section 3, the spindle controlling section 4, the feed controlling section 5, the ATC controlling section 6, the run-out diagnosing section 8 and the display controlling section 9 are constituted by a CPU, a ROM, a RAM and the like. The data storage section 10 is comprised of an auxiliary storage.

The machining program executing section 3 analyzes a preliminarily stored machining program and executes the program. More specifically, the machining program executing section 3 reads out commands related to spindle rotation, a feed speed, a feed position, tool change and the like from the machining program, and transmits a command of the rotation of the spindle unit 15 to the spindle controlling section 4, a command of the feed speed and feed position of the feed mechanism 14 to the feed controlling section 5, and a command of the tool change to the ATC controlling section 6. Upon reception of the commands from the machining program executing section 3, the spindle controlling section 4, the feed controlling section 5 and the ATC controlling section 6 respectively generate control signals, and transmit the control signals to the feed mechanism 14, the spindle unit 15 and the ATC unit 16 via the input/output interface 12 and the control circuit 13 for control of the operations thereof. The display controlling section 9 is connected to the CRT 18 via the input/output interface 12 for control of display on the CRT 18. The coordinates of the position of the feed mechanism 14 and the machining program are usually displayed on the CRT 18.

The run-out diagnosing section 8 has a diagnosing program for performing a process as shown in FIG. 6, and analyzes the diagnosing program for the execution of the program.

More specifically, the run-out diagnosing section 8 starts performing the process shown in FIG. 6 upon reception of a diagnosis execution signal inputted from the operation panel 17. First, a command for attaching the test tool T stored in the tool magazine to the spindle is transmitted to the ATC controlling section 6, and the ATC unit 16 is driven under the control of the ATC controlling section 6 to attach the test tool T to the spindle (Step S1).

Then, a movement command for inserting the test tool T into the insertion hole 21a of the main body 21 is transmitted to the feed controlling section 5, and the feed mechanism 14 is driven under the control of the feed controlling section 5 to insert the test tool T into the insertion hole 21a of the main body 21 (Step S2).

Subsequently, a command for rotating the spindle at a lower rotation speed is transmitted to the spindle controlling section 4, and the spindle unit 15 is driven under the control of the spindle controlling section 4 to rotate the spindle fitted with the test tool T at the lower rotation speed (Step S3). The term "lower rotation speed" herein means a rotation speed up to about 100 min$^{-1}$ and, for stable measurement of the deflection, the rotation speed is preferably not greater than 100 min$^{-1}$.

In turn, deflection data inputted from the four deflection detecting sensors 22 is sampled for a predetermined period and stored in the data storage section 10. Then, a difference between a maximum value and a minimum value of the deflection data is calculated as a deflection amount for each of the deflection detecting sensors 22. The greatest one of the deflection amounts for the respective deflection detecting sensors 22 is stored as a static run-out $\delta_s$ in the data storage section 10 (Step S4).

Subsequently, a command for rotating the spindle at a higher rotation speed is transmitted to the spindle controlling section 4, and the spindle is rotated at the higher rotation speed (Step S5). The term "higher rotation speed" herein means a rotation speed higher than the lower rotation speed. The higher rotation speed is preferably the highest possible rotation speed, as long as data can properly be sampled by the numerical controller 2. More preferably, the higher rotation speed is a rotation speed closer to a natural frequency of the spindle to provide stricter measuring conditions.

As in Step S4, deflection data inputted from the four deflection detecting sensors 22 is sampled for a predetermined period and stored in the data storage section 10. Then, a difference between a maximum value and a minimum value of the deflection data is calculated as a deflection amount for each of the deflection detecting sensors 22. The greatest one of the deflection amounts for the respective deflection detecting sensors 22 is stored as a dynamic run-out $\delta_d$ in the data storage section 10 (Step S6).

Thereafter, the static run-out $\delta_s$ is compared with a static run-out reference value $\delta_{s0}$ preliminarily stored in the data storage section 10 (Step S7) and, if it is judged that $\delta_s$ is smaller than $\delta_{s0}$, the process goes to the next step. Then, the dynamic run-out $\delta_d$ is compared with a dynamic run-out reference value $\delta_{d0}$ preliminarily stored in the data storage section 10 (Step S8) and, if it is judged that $\delta_d$ is smaller than $\delta_{d0}$, an output is generated to indicate that the run-out is normal (Step S9). If it is judged in Step S7 that $\delta_s$ is not smaller than $\delta_{s0}$ or if it is judged in Step S8 that $\delta_d$ d is not smaller than $\delta_{d0}$, an output is generated to indicate that the run-out is abnormal (Step S10). The output generated in Step S9 or S10 is transmitted to the display controlling section 9, which in turn displays "NORMAL" or "ABNORMAL" on the CRT 18.

After the diagnosis on the static run-out and the dynamic run-out, a movement command is transmitted to the feed controlling section 5, and the feed mechanism 14 is driven to move the test tool T back to the original position (Step S11). Then, a tool change command is transmitted to the ATC controlling section 6, and the ATC unit 16 is driven to store the test tool T in the tool magazine (Step S12). Thus, the diagnosing process is completed.

In the NC machine tool 1 of this embodiment having the construction described above, the test tool T for the run-out diagnosis is automatically attached to the spindle and moved to the measurement position, then the run-out diagnosing operation is automatically performed, and the result of the diagnosis is displayed on the CRT 18. Therefore, the user of the NC machine tool 1 can easily perform a regular run-out diagnosing operation in a daily work at any time. By thus performing the regular run-out diagnosing operation, a machining failure and a malfunction of the machine tool can be prevented.

The spindle runs out of its rotation center axis not only evenly but also eccentrically in one direction. In this embodiment, the four deflection detecting sensors 22 are circumferentially equidistantly arranged with the detecting directions thereof being perpendicular to each other, so that even the eccentric run-out of the spindle can assuredly be detected by at least one of the deflection detecting sensors 22. Thus, the run-out of the spindle can reliably be detected.

In this embodiment, the diagnosis is conducted on the static run-out observed when the spindle is rotated at the lower rotation speed and on the dynamic run-out observed when the spindle is rotated at the higher rotation speed. Therefore, the spindle run-out diagnosing operation can be performed in a suitable manner for the higher-speed machining.

While one embodiment of the present invention has thus been described, it should be understood that the invention be not limited to the embodiment. Although the test tool T is automatically attached to the spindle and moved to the measurement position in the embodiment described above, these operations may manually be performed. Even in this case, the test tool T can exactly and properly be positioned with respect to the deflection detecting sensors 22, because the test tool T is inserted into the insertion hole 21a of the main body 21. Further, the number of the deflection detecting sensors 22 is not particularly limited, but may be one or more.

What is claimed is:

1. An NC machine tool having a spindle run-out diagnosing function, the NC machine tool having a spindle for rotating a tool held thereby and adapted to numerically control a relative movement between the spindle and a workpiece, the NC machine tool comprising:

deflection detecting means provided on a base within a machining area for detecting a deflection of an outer circumferential surface of a test tool attached to the spindle when the test tool is rotated about an axis thereof; and run-out diagnosing means for conducting a diagnosis on run-out of the spindle by calculating an amount of the run-out of the spindle on the basis of the deflection detected by the deflection detecting means and comparing the calculated run-out amount with a predetermined tolerance, wherein the deflection detecting means comprises a main body having an insertion hole for receiving the test tool, and at least two non-contact type deflection detecting sensors fixed to the main body with a detecting portion thereof projecting in the insertion hole and deflection detecting directions thereof being perpendicular to each other, wherein the main body is fixed to the base, and the deflection of the test tool is detected by the non-contact type deflection detecting sensor with the test tool inserted in the insertion hole of the main body.

2. An NC machine tool having a spindle run-out diagnosing function, the NC machine tool having a spindle for rotating a tool held thereby and adapted to numerically control a relative movement between the spindle and a workpiece, the NC machine tool comprising:

deflection detecting means provided on a base within a machining area for detecting a deflection of an outer circumferential surface of a test tool attached to the spindle when the test tool is rotated about an axis thereof; and run-out diagnosing means for conducting a diagnosis on run-out of the spindle by calculating an amount of the run-out of the spindle on the basis of the deflection detected by the deflection detecting means and comparing the calculated run-out amount with a predetermined tolerance, wherein the deflection detecting means comprises a main body having an insertion hole for receiving the test tool, and two pairs of non-contact type deflection detecting sensors fixed in a diametrically opposite relation with to the main body with a detecting portion thereof protecting in the insertion hole and deflection detecting directions of one pair of non-contact type deflection detecting sensors being perpendicular to deflection detecting directions of the other pair of non-contact type deflection detecting sensors, wherein the main body is fixed to the base, and the deflection of the test tool is detected by the non-contact type deflection detecting sensor with the test tool inserted in the insertion hole of the main body.

3. An NC machine toot as set forth in any of claim 1 or 2, wherein the run-out diagnosing means conducts a diagnosis on a static run-out observed when the spindle is rotated at a lower rotation speed and on a dynamic run-out observed when the spindle is rotated at a higher rotation speed.

* * * * *